(12) United States Patent
Ishimura et al.

(10) Patent No.: US 6,978,080 B1
(45) Date of Patent: *Dec. 20, 2005

(54) VIDEO SWITCHER

(75) Inventors: Tsuneaki Ishimura, Yokohama (JP);
Kazuo Nozaki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1005 days.

This patent is subject to a terminal disclaimer.

(21) Appl. No.: 09/650,742

(22) Filed: Aug. 30, 2000

(30) Foreign Application Priority Data

Aug. 31, 1999 (JP) .................................. 11-244722

(51) Int. Cl.[7] .......................... H04N 11/00; H04N 7/00
(52) U.S. Cl. ............................. 386/46; 386/1; 386/124; 386/126; 386/111; 386/109; 386/37; 360/32
(58) Field of Search .................... 386/46, 124–126, 386/1, 109, 111–112, 27, 33–35, 40, 131; 360/8, 32; 358/338

(56) References Cited

U.S. PATENT DOCUMENTS 5,517,368 A * 5/1996 Arai et al. ........................ 360/8
6,249,639 B1 * 6/2001 Amada et al. .................. 386/46
6,665,488 B1 * 12/2003 Kaneko et al. ................. 386/46

FOREIGN PATENT DOCUMENTS

| | | |
|---|---|---|
| GB | 2330977 | 5/1999 |
| JP | 8505500 | 6/1996 |
| JP | 969008 | 3/1997 |
| WO | 9416525 | 7/1994 |

* cited by examiner

Primary Examiner—Andrew Faile
Assistant Examiner—Jamie Vent
(74) Attorney, Agent, or Firm—Stevens, Davis, Miller & Mosher, LLP (57) ABSTRACT

A video switching apparatus in which an operating mode (recording/reproduction) of a recording/reproducing apparatus is discriminated from a video output signal of the recording/reproducing apparatus by recording/reproduction detecting portion, thereby enabling an automatic switching of a setting mode of the video switching apparatus. It is possible to prevent recording failures which may be otherwise caused due to an inconsistency between the mode settings of the video switching apparatus and the recording/reproducing apparatus connected thereto.

20 Claims, 5 Drawing Sheets

VIDEO SWITCHER

BACKGROUND OF THE INVENTION

1. Field of the Invention

The invention relates to a video switching apparatus for switching a plurality of video inputs on a time unit basis of a frame, a field, or the like, outputting them to a recording/reproducing apparatus, and outputting reproduction video images from the recording/reproducing apparatus to a monitor.

2. Description of the Related Art

Hitherto, a video switching apparatus called a frame switcher or a multiplexer is connected to a recording/reproducing apparatus and used. Upon recording, the video switching apparatus switches a plurality of video signals of monitoring cameras or the like on a time unit basis of a frame, a field, or the like, multiplexes an identification (ID) signal to them, and outputs the resultant video signals, and those signals are recorded by the recording/reproducing apparatus.

Upon reproduction, the ID signal multiplexed to the video signal reproduced from the recording/reproducing apparatus is read (e.g., by bit reading portion shown herein later) and, when it coincides with a set ID in the video switching apparatus, the video signal is written in a memory and outputted to a monitor (e.g., by CPU, video input selecting portion, output means). When it does not coincide with the set ID, the video signal is not written in the memory but the video signal written in the memory is outputted to the monitor.

As mentioned above, when the recorded video images are reproduced while switching a plurality of video images by multiplexing the ID signal to the video signal, the ID signal is set by the video switching apparatus and only the video image to which the same ID signal has been multiplexed can be outputted to the monitor.

In the above conventional video switching apparatus, however, there are two kinds of operating modes of a recording mode and a reproducing mode. The recording/reproducing mode of the video switching apparatus has to be manually set in accordance with the operating mode of the recording/reproducing apparatus connected to the video switching apparatus and there is such a problem that if the operating mode is erroneously set, the video signal cannot be correctly recorded/reproduced.

SUMMARY OF THE INVENTION

The invention intends to solve the above conventional problem and it is an object of the invention to provide an excellent video switching apparatus which can automatically set a proper operating mode and prevent the erroneous operation.

According to one aspect of the invention, there is provided a video switching apparatus comprising: video input selecting means for switching a plurality of video inputs signals; output means for outputting the switched video input signal to a recording/reproducing apparatus; recording/reproduction detecting means for analyzing a video output of the recording/reproducing apparatus and discriminating whether the recording/reproducing apparatus is in a recording mode or a reproduction mode; and control means for switching its own operation mode to a recording mode or a reproducing mode on the basis of a result determined by the recording/reproduction detecting means.

With this construction, an erroneous operation due to an erroneous setting of the video switching apparatus and the recording/reproducing apparatus can be prevented.

The video switching apparatus of the invention has means for outputting information indicating whether the recording/reproducing apparatus is in the recording mode or reproduction mode to the outside on the basis of the discrimination result of the discriminating means.

With this construction, even from a position where a display or indicator of the recording/reproducing apparatus cannot be seen, by displaying a state of the signal outputted to the outside, the operating mode of the recording/reproducing apparatus can be confirmed.

BRIEF DESCRIPTION OF THE DRAWINGS

The features and advantages of the present invention will become more clearly appreciated from the following description taken in conjunction with the accompanying drawings, in which.

DESCRIPTION OF THE EMBODIMENTS

Figure 1:
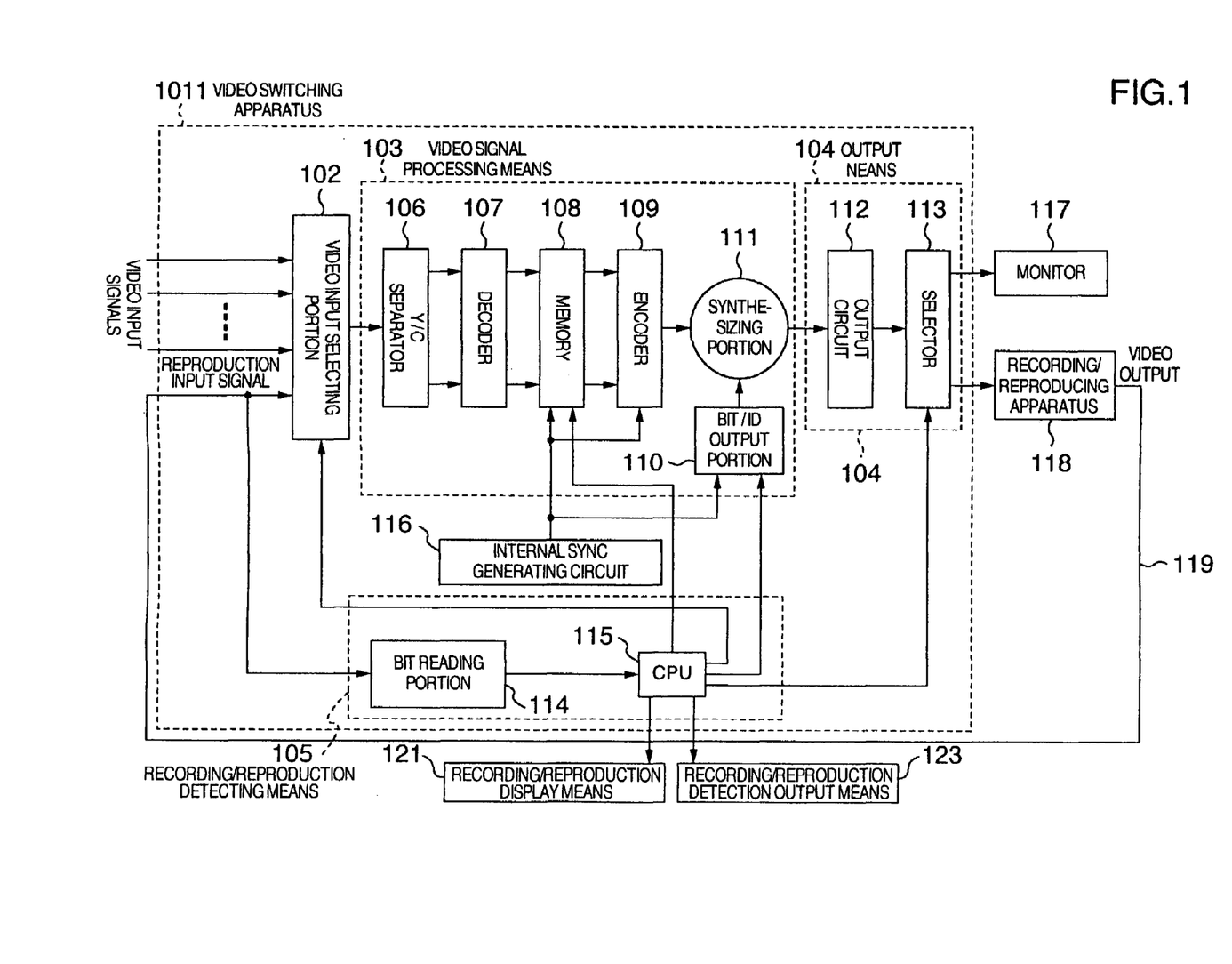
FIG. 1 is a block diagram of a video switching apparatus in the first embodiment of the invention.

FIG. 1 is a block diagram of a video switching apparatus in the first embodiment of the invention.

A video switching apparatus 1011 comprises: video input selecting portion 102 for switching a plurality of video inputs signals; video signal processing means 103 for processing the selected video signal; output means 104 for outputting the video signal; recording/reproduction detecting means 105 for detecting an operating mode of a recording/reproducing apparatus 118; and an internal sync generating circuit 116.

The video signal processing means 103 comprises: a Y/C separator 106 for separating an input video signal into a luminance signal and color difference signals; a decoder 107 for decoding the video signals outputted from the Y/C separator 106; a memory 108 for storing the video signals; an encoder 109 for encoding the video signals; a bit/ID output portion 110 for outputting an ID signal/a bit signal in which H/L of one or a few bits are outputted at random; and a synthesizing portion 111 for multiplexing or adding the bit signal/ID signal to the video signals from the encoder 109.

The output means 104 comprises: an output circuit 112 for amplifying the video signal to a proper level and outputting the amplified signal; and a selector 113 for selecting an output destination of the video signal.

The recording/reproduction detecting means 105 comprises: a bit reading portion 114 for reading the bit signal multiplexed to the reproduction signal from the recording/reproducing apparatus 118; and a CPU 115 for controlling the video input selecting portion 102 and selector 113 and setting the bit signal.

A method of detecting the recording/reproduction of the first embodiment of the invention will now be described.

Video output signal in the recording mode and the reproducing mode of the recording/reproducing apparatus 118 will be first described. Usually, the apparatus 118 outputs from its video output terminal the inputted video signal as it is in the recording mode.

In the reproducing mode, the video signal recorded on a tape or the like is outputted. That is, in the recording mode, since the video signal outputted from the video switching apparatus 1011 passes through the apparatus 118 and is inputted as it is to the video switching apparatus 1011, the same bit signal as the bit signal set by the CPU 115 can be detected. In the reproducing mode, since the tape which was recorded in the past is reproduced, a bit signal different from the bit signal set by the CPU 115 is detected.

Figure 2:
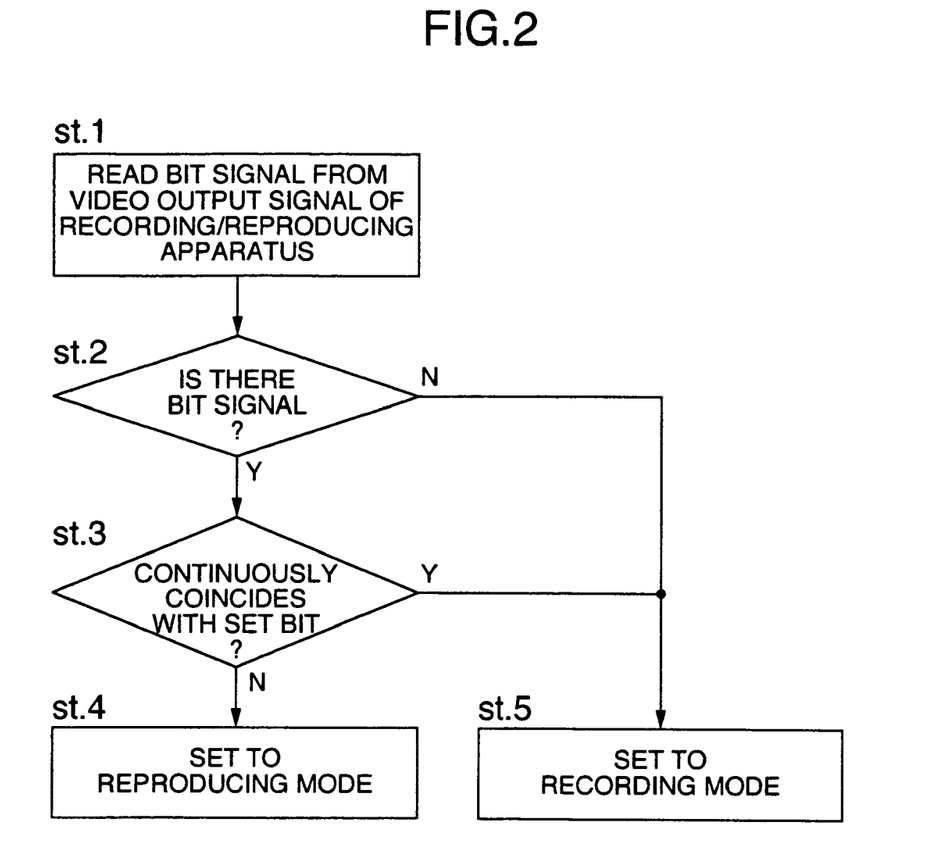
FIG. 2 is a flowchart for a recording/reproduction detecting method in the first embodiment of the invention.

The above recording/reproduction detecting method will now be described with reference to a flowchart of FIG. 2.

The bit signal is detected from the video output signal of the apparatus 118 by the bit reading portion 114 (step 1). When the bit signal is detected, the detected bit signal is compared with the multiplexed bit signal (multiplexed by synthesizing portion 111) (that is, they are compared by CPU 115) (step 2). When the bit signal cannot be detected or when the detected bit signal continuously coincides with the set bit signal by a length of a few fields, the video switching apparatus is set to the recording mode (by using CPU 115, video input selecting portion 102, etc.) (steps 3 and 5). When the detected bit signal and the set bit signal do not coincide, the video switching apparatus 1011 is set to the reproducing mode (sets 3 and 4).

The above method can be also realized by either software or hardware.

When a video transmission cable 119 is not connected from the video output terminal of the apparatus 118 to the input side of the video switching apparatus 1011, since the bit signal cannot be detected by the bit reading portion 114, the video switching apparatus is set to the recording mode.

According to the video switching apparatus in the first embodiment of the invention as mentioned above, the multiplexed bit signal of the video output signal of the recording/reproducing apparatus is detected and compared with the set bit signal, thereby enabling the recording/reproducing mode to be automatically switched without using another control line. Even if the video transmission cable is not connected from the apparatus 118 to the video switching apparatus 1011, since the video switching apparatus is in the recording mode, a mistake such that the video signal cannot be recorded can be prevented.

The second embodiment of the invention will be described with reference to FIG. 3.

Figure 3:
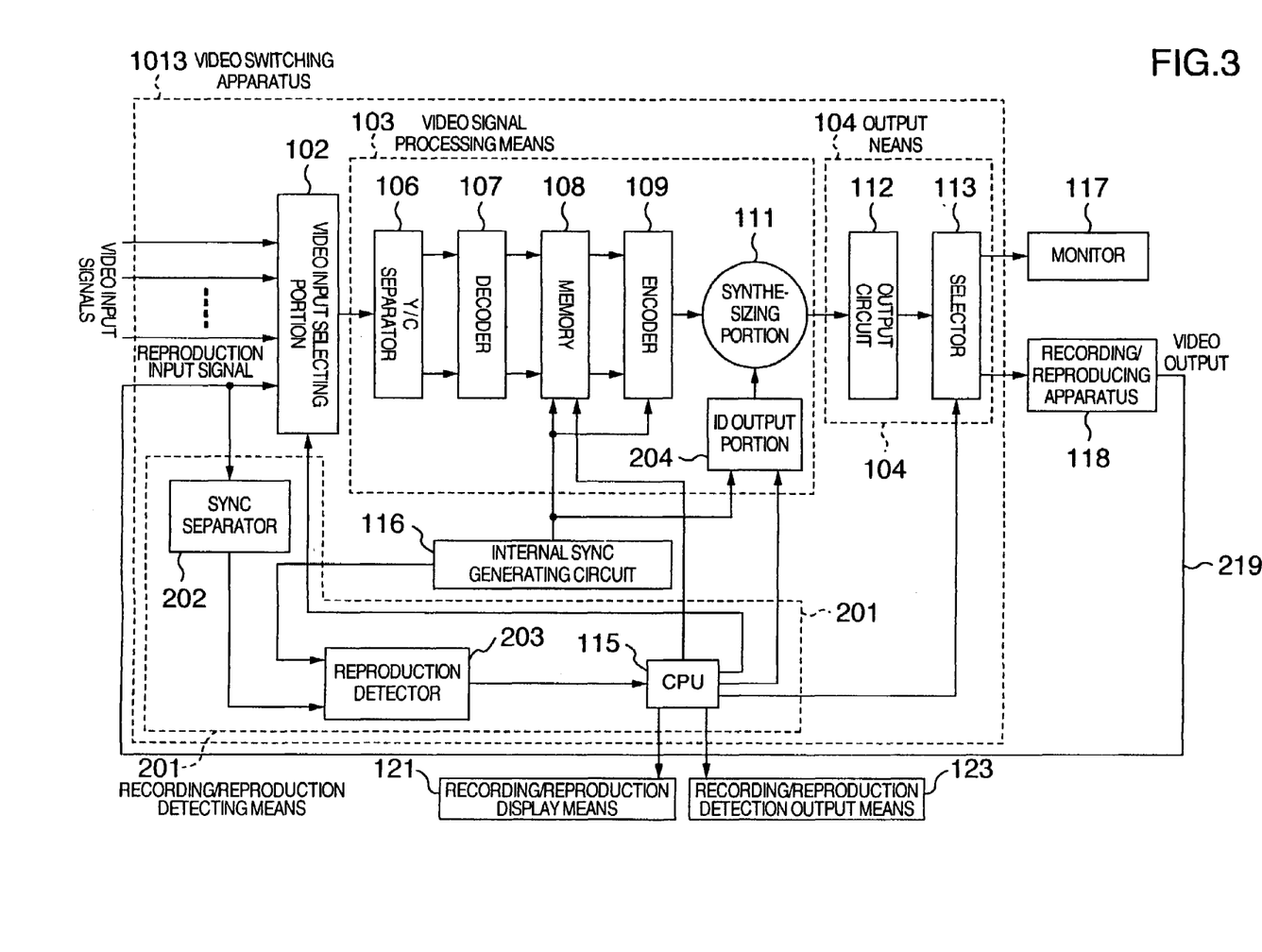
FIG. 3 is a block diagram of a video switching apparatus in the second embodiment of the invention.

FIG. 3 is a block diagram of a video switching apparatus in the second embodiment of the invention.

The apparatus of FIG. 3 differs from that of FIG. 1 with respect to a point that recording/reproduction detecting means 201 comprises: a sync separator 202 for detecting a sync signal from the video output signal of the recording/reproducing apparatus 118; and a reproduction detector 203 for comparing the sync signal detected from the sync separator 202 with a sync signal outputted from the internal sync signal generating circuit 116. ID output portion 204 operates substantially same as the ID output operation of bit/ID output portion 110 shown in FIG. 1.

A recording/reproduction detecting method in the second embodiment of the invention will now be described. First, a difference between the video output signals of the apparatus 118 in the reproducing mode and the recording mode will be described. Since a mechanical rotational vibration called a wow and flutter of the apparatus 118 exerts an influence on the video output signal in the reproducing mode, stability and precision of the sync signal deteriorate. Generally, since the input signal of the apparatus 118 is outputted as it is as for the video output signal in the recording mode, it becomes the signal which coincides with the internal sync signal in the video switching apparatus 1013 and the stability as a sync signal is maintained as it is. As mentioned above, the operating mode of the apparatus 118 is detected by the difference in the video output signal of the apparatus 118.

Figure 4:
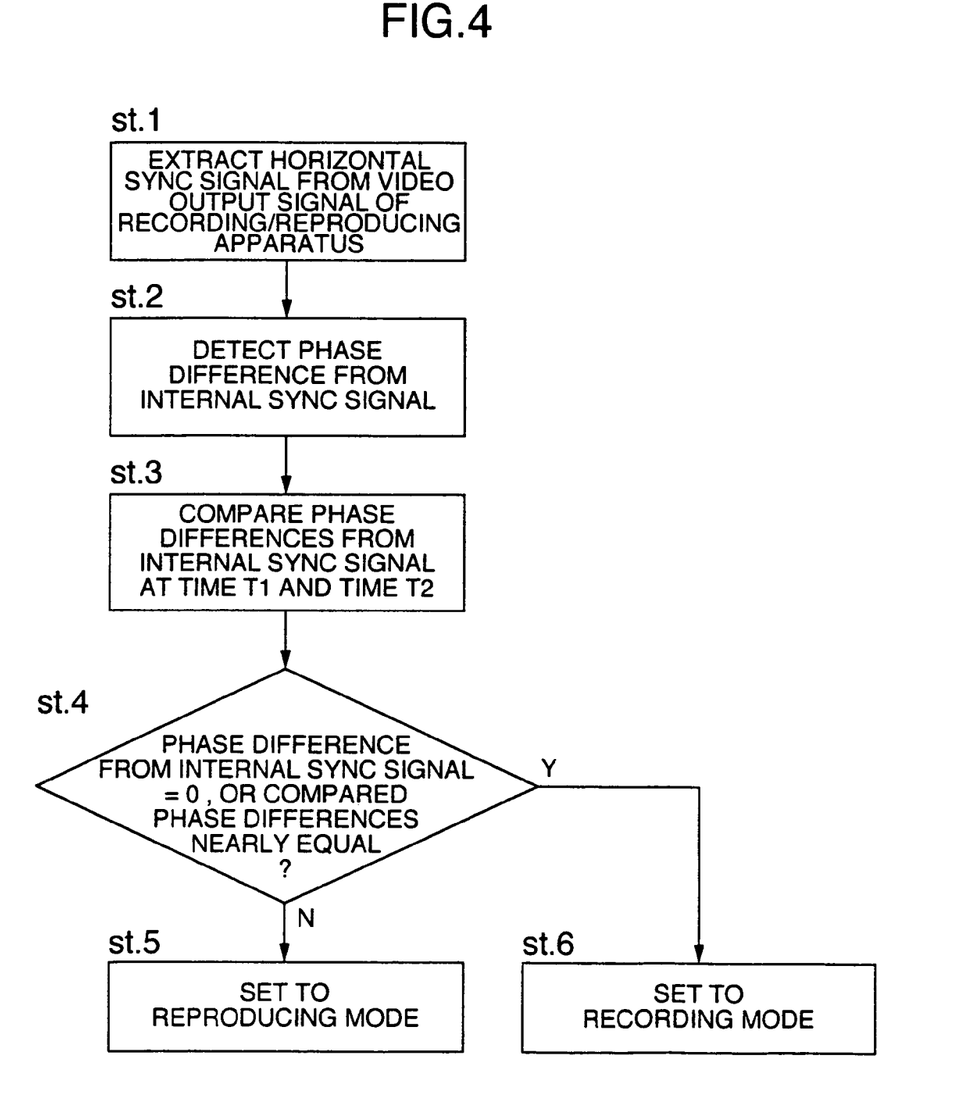
FIG. 4 is a flowchart for a recording/reproduction detecting method in the second embodiment of the invention.

FIG. 4 is a flowchart showing the recording/reproduction detecting method.

A horizontal sync signal is detected from the video output signal of the recording/reproducing apparatus 118 (step 1). A phase difference between the detected horizontal sync signal and an internal horizontal sync signal is detected at time T1 and time T2 (step 2) (e.g., $\theta_1$, $\theta_2$). The phase differences ($\theta_1$, $\theta_2$) detected at time T1 and time T2 are compared (step 3). When the phase difference ($\theta$) from the internal horizontal sync signal is equal to 0 or a value which is extremely close to 0 or when the phase differences compared in step 3 are substantially or nearly equal to each other ($\theta_1 \approx \theta_2$), the video switching apparatus is set to the recording mode (steps 4 and 6). If there is a phase difference ($\theta \neq$ zero) from the internal horizontal sync signal and when the value between the phase differences compared in step 3 are not substantially or nearly equal to each other, i.e., not ($\theta_1 \approx \theta_2$) the video switching apparatus is set to the reproducing mode (steps 4 and 5).

As specific values, when a clock frequency (e.g., FIG. 5 INTCLK) is equal to 3.2 MHz, if the phase difference ($\theta$) from the internal horizontal sync signal is less than 1 $\mu$sec, then the apparatus is set to the recording mode; and, when it is equal to or larger than 1 $\mu$sec, then the apparatus is set to the reproducing mode. When a difference of 0.3 $\mu$sec or more occurs as a value ($\|\theta_1 - \theta_2\|$) between the phase differences compared in step 3, the apparatus is set to the reproducing mode.

Although the case where the number of the comparing operation times is equal to 1 has been described here, it is also possible to discriminate on the basis of data obtained by comparing more than one times in order to improve discriminating precision.

Although the horizontal sync signal is used as a signal to be compared, since it is necessary or sufficient that the phase difference can be detected, a composite sync signal (EXT SYNC) which is obtained by sync separator 202 can be also used instead of the horizontal sync signal.

Figure 5:
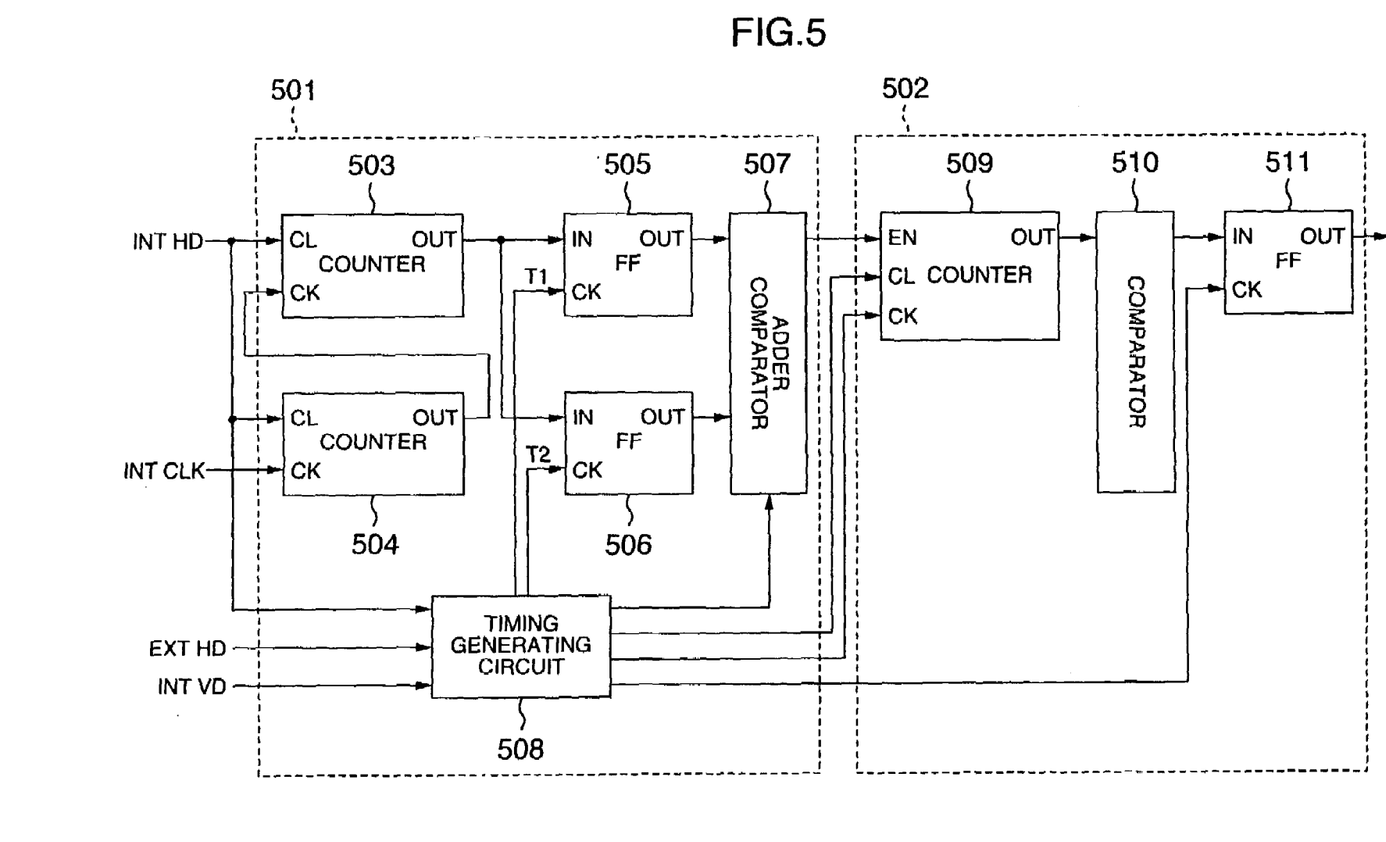
FIG. 5 is a diagram of a recording/reproduction detecting circuit in the second embodiment of the invention.

A specific circuit of the reproduction detector 203 will now be described hereinbelow with reference to FIG. 5.

The reproduction detector 203 is constructed by a phase detecting portion 501 and a discriminating portion 502.

The phase detecting portion 501 comprises: counters 503 and 504; flip-flops (hereinafter, simply abbreviated to FFs) 505 and 506; an adder/comparator 507; and a timing generating circuit 508. The discriminating portion 502 comprises: a counter 509; a comparator 510; and an FF 511.

The timing generating circuit 508 generates timing pulses T1 and T2 from an external sync signal (EXT HD) and an internal sync signal (INT HD). Count values from the counters 503 and 504 are inputted into the FFs 505 and 506 by using the timing pulses T1 and T2 and a relative phase difference is detected by the adder/comparator 507. The counter 509 is made operative by the timing pulses generated by the circuit 508 in order to output several times in response to a respective detection result outputted from the adder/comparator 507 to the comparator 510 in order to improve precision in the reproduction detection. If detection result outputs compared by the comparator 510 are substantially or nearly equal to each other, it is determined that the apparatus 118 is in the recording mode. If they are not substantially or nearly equal, it is determined that the apparatus 118 is in the reproducing mode. This operation provides the following merit, for example. In a rare case such that (one time) detection result output at a some timing may be an erroneous result, the determination can be made by majority logic even with a few errorneous results contained in such several times outputs.

Although the discriminating method has been described above with hardware, it can be also realized in combination with software.

When the video transmission cable 219 is not connected from the recording/reproducing apparatus 118 to the video switching apparatus 1013, since the external sync signal (EXT HD) is not detected, the FFs 505 and 506 have the same value and it is determined that the apparatus is in the recording mode. In FIG. 5, signals of INTHD, INTCLK, INTVD are generated from internal sync generating circuit 116, and signals of EXTHD, EXTSYNC are obtained from sync separator 202.

The video switching apparatus in the second embodiment of the invention as mentioned above can detect (by sync separator 202) the horizontal sync signal from the video output signal of the apparatus 118, discriminate (by reproduction detector 203) the operating mode of the apparatus 118 on the basis of a relative phase difference between the detected horizontal sync signal and the internal horizontal sync signal, and automatically switch the recording/reproducing mode. Even if the video transmission cable 219 is not connected from the apparatus 118 to the video switching apparatus 1013, since the video switching apparatus is set in the recording mode, a mistake such that the video signal cannot be recorded can be prevented.

As described above, since the operating mode of the apparatus 118 can be detected in the video switching apparatus by displaying the operation state or mode of the apparatus 118 by recording/reproduction display 121 or by transmitting a detection result by recording/reproduction detection output means 123, the recording mode of the apparatus can be confirmed even at a remote place such as a monitoring room or the like. The foregoing are described exemplarily for analog video inputs signals, it appears obvious to those skilled that applications of the present inventions for digital video inputs signals are possible and covered by present claims.

As described above, according to the invention, the operating mode of the video switching apparatus can be automatically switched in accordance with the operating mode of the connected recording/reproducing apparatus without using another control line. An erroneous operation due to a mistake of the setting, particularly, a mistake or failure in the recording can be remarkably reduced, and the operating mode of the recording/reproducing apparatus can be displayed, or a signal indicative of the operating mode can be outputted to the outside. A video switching apparatus having an advantageous effect such that the operating mode of the recording/reproducing apparatus can be confirmed even if a display screen of the recording/reproducing apparatus cannot be seen is provided.

What is claimed is:

1. A video switching apparatus comprising:
   video input selecting means for switching to select at least one of a plurality of video inputs signals;
   output means for outputting the selected video input signal to a recording/reproducing apparatus;
   recording/reproduction detecting means for analyzing a video signal received from said recording/reproducing apparatus and discriminating whether the recording/reproducing apparatus is in a recording mode or a reproduction mode; and
   control means for switching an operation mode of the video switching apparatus to a recording mode or a reproducing mode on the basis of a result determined by said recording/reproduction detecting means.

2. An apparatus according to claim 1, wherein said recording/reproduction detecting means has discriminating means for comparing a signal set at random in said video switching apparatus with a signal multiplexed in a video output signal of said recording/reproducing apparatus and discriminating whether said recording/reproducing apparatus is in the recording mode or the reproduction mode on the basis of the comparison result.

3. An apparatus according to claim 1, wherein said recording/reproduction detecting means includes discriminating means for comparing, in phase, a sync signal of the video signal which is outputted to said recording/reproducing apparatus with a sync signal separated from the video signal outputted from said recording/reproducing apparatus and determining that said recording/reproducing apparatus is in the recording mode in the case where the comparison result indicates that phases of the compared sync signals are nearly equal to each other.

4. An apparatus according to claim 1, wherein said recording/reproduction detecting means includes discriminating means for comparing, in phase, a sync signal of the video signal which is outputted to said recording/reproducing apparatus with a sync signal separated from the video signal outputted from said recording/reproducing apparatus and determining that said recording apparatus is in the reproduction mode in the case where the comparison result indicates phases of the compared sync signals are not nearly equal to each other.

5. An apparatus according to claim 1, wherein said recording/reproduction detecting means includes:
   discriminating means for comparing a horizontal sync signal of the video signal which is outputted to said recording/reproducing apparatus with a horizontal sync signal separated from the video signal outputted from said recording/reproducing apparatus and discriminating whether said recording/reproducing apparatus is in the recording mode or the reproducing mode; and
   the control means switches the operation mode of the video switching apparatus to the recording mode or the reproducing mode on the basis of the discrimination result of said discriminating means.

6. An apparatus according to claim 1, wherein said recording/reproduction detecting means includes discriminating means for determining that said recording/reproducing apparatus is in the recording mode when a video transmission cable from said recording/reproducing apparatus is not connected.

7. An apparatus according to claim 1, further comprising means for displaying information indicating whether said recording/reproducing apparatus is in the recording mode or the reproduction mode on the basis of the result determined by said recording/reproduction detecting means.

8. An apparatus according to claim 2, further comprising means for displaying information indicating whether said recording/reproducing apparatus is in the recording mode or the reproduction mode on the basis of the discrimination result of said discriminating means.

9. An apparatus according to claim 3, further comprising means for displaying information indicating whether said recording/reproducing apparatus is in the recording mode or the reproduction mode on the basis of the determination result of said discriminating means.

10. An apparatus according to claim 4, further comprising means for displaying information indicating whether said recording/reproducing apparatus is in the recording mode or the reproduction mode on the basis of the determination result of said discriminating means.

11. An apparatus according to claim 1, further comprising means for outputting information indicating whether said recording/reproducing apparatus is in the recording mode or the reproduction mode to the outside on the basis of the result determined by said recording/reproduction detecting means.

12. An apparatus according to claim 2, further comprising means for outputting information indicating whether said recording/reproducing apparatus is in the recording mode or the reproduction mode to the outside on the basis of discrimination result of said discriminating means.

13. An apparatus according to claim 3, further comprising means for outputting information indicating whether said recording/reproducing apparatus is in the recording mode or the reproduction mode to the outside on the basis of the determination result of said discriminating means.

14. An apparatus according to claim 4, further comprising means for outputting information indicating whether said recording/reproducing apparatus is in the recording mode or the reproduction mode to the outside on the basis of the determination result of said discriminating means.

15. A video switching apparatus comprising:
video input selecting means for switching to select at least one of a plurality of input video signals;
output means for outputting the selected input video signal as an output video signal to a recording/reproducing apparatus;
recording/reproduction detecting means for comparing a video signal received from said recording/reproducing apparatus and the output video signal of said output means and discriminating whether the compared video signals are identical or not identical; and
control means for switching between a recording mode operation and a reproducing mode operation on the basis of the discrimination result of said recording/reproduction detecting means.

16. The apparatus according to claim 15, wherein the recording/reproduction detecting means:
generates a random ID signal and multiplexes the random ID signal with the selected input video signal to produce the output signal to the recording/reproducing apparatus;
compares the generated ID signal with an ID signal multiplexed within the video signal received from said recording/reproducing apparatus; and discriminates whether the compared ID signals are identical or not identical.

17. The apparatus according to claim 15, wherein the recording/reproduction detecting means:
separates a sync signal from the video signal received from the recording/reproducing apparatus;
phase compares the separated sync signal with a sync signal contained within the output video signal provided to the recording/reproducing apparatus, so as to detect a phase difference therebetween; and
discriminates whether the detected phase difference is within a predetermined range, wherein
the control means switches to the recording mode operation when the detected phase difference is within the predetermined range.

18. An apparatus according to claim 15, wherein the recording/reproduction detecting means:
separates a sync signal from the video signal received from the recording/reproducing apparatus;
phase compares the separated sync signal with a sync signal contained within the output video signal provided to the recording/reproducing apparatus, so as to detect a phase difference therebetween; and
discriminates whether the detected phase difference is outside a predetermined range, wherein
the control means switches to the reproducing mode operation when the detected phase difference is outside the predetermined range.

19. An apparatus according to claim 17 or 18, wherein the separated sync signal and the sync signal contained within the output video signal provided to the recording/reproducing apparatus are horizontal sync signals.

20. The video switching apparatus of claim 1 or 15, wherein:
said recording/reproducing apparatus provides the selected video signal received from the output means to the recording/reproduction detecting means when operating in the recording mode and provides a video signal different from the selected video signal when operating in the reproducing mode; and
said recording/reproduction detecting means has discrimination means for comparing: (1) a bit signal within, and identifying, the selected input video signal and (2) a bit signal within, and identifying, the video signal received from said recording/reproducing apparatus, wherein:
said discriminating means discriminates whether the recording/reproducing apparatus is in the recording mode or the reproducing mode based on the result of the bit signal comparison.

* * * * *

UNITED STATES PATENT AND TRADEMARK OFFICE
CERTIFICATE OF CORRECTION

PATENT NO. : 6,978,080 B1
DATED : December 20, 2005
INVENTOR(S) : Tsuneaki Ishimura et al.

It is certified that error appears in the above-identified patent and that said Letters Patent is hereby corrected as shown below:

<u>Title page,</u>
Item [*] Notice, delete "This patent is subject to a terminal disclaimer.".

Signed and Sealed this

Twenty-fifth Day of April, 2006

JON W. DUDAS
*Director of the United States Patent and Trademark Office*